United States Patent [19]

Canadas

[11] Patent Number: 5,090,858
[45] Date of Patent: Feb. 25, 1992

[54] HOLDING DEVICE FOR FIXING OBJECTS TO MOTOR VEHICLES INTERIOR PARTS

[75] Inventor: Jean-C. Canadas, Remiremont, France

[73] Assignee: Rockwell-Cim Societe Anonyme

[21] Appl. No.: 656,124

[22] Filed: Feb. 14, 1991

Related U.S. Application Data

[63] Continuation of Ser. No. 325,364, Mar. 17, 1989, abandoned.

[30] Foreign Application Priority Data

Mar. 17, 1988 [FR] France .............................. 88 03472

[51] Int. Cl.$^5$ ............................................. F16B 15/00
[52] U.S. Cl. .................................... 411/439; 411/469; 248/475.1; 403/406.1
[58] Field of Search ................. 411/40, 356, 439, 469, 411/441, 446, 447, 450, 451, 456, 488, 493, 494, 496, 508, 904, 908, 909, 922, 41; 248/216.1, 71, 475.1; 403/406.1

[56] References Cited

U.S. PATENT DOCUMENTS

| | | |
|---|---|---|
| 1,757,280 | 5/1930 | Withrow ...................... 248/475.1 X |
| 2,961,210 | 11/1960 | Pfaff et al. ...................... 248/71 X |
| 3,105,407 | 10/1963 | Rapata ...................... 411/41 |
| 3,417,438 | 12/1968 | Schuplin ...................... 411/41 X |
| 3,491,972 | 1/1970 | Townshend ...................... 411/442 X |
| 3,843,236 | 10/1974 | Kurz, Jr. . | |
| 3,848,080 | 11/1974 | Schmidt ...................... 248/216.1 X |
| 3,913,810 | 10/1975 | Shaw . | |
| 3,960,460 | 6/1976 | Fischer ...................... 403/406.1 |
| 4,069,549 | 1/1978 | Zernig et al. ...................... 248/216.1 X |
| 4,094,490 | 6/1978 | Einhorn ...................... 411/60 |
| 4,179,089 | 12/1979 | Parr, Jr. ...................... 248/216.1 |
| 4,588,152 | 5/1986 | Ruehl et al. ...................... 411/41 X |
| 4,655,423 | 4/1987 | Schavilje et al. ............ 248/216.1 X |
| 4,681,366 | 7/1987 | Lobanoff ...................... 248/475.1 X |
| 4,733,835 | 3/1988 | Schlanger et al. ................ 411/41 X |
| 4,760,659 | 8/1988 | Watabe ...................... 411/41 X |
| 4,973,020 | 11/1990 | Canadas ...................... 248/475.1 X |

FOREIGN PATENT DOCUMENTS

| | | |
|---|---|---|
| 505419 | 9/1951 | Belgium ...................... 248/216.1 |
| 0099454 | 2/1984 | European Pat. Off. . | |
| 204301 | 12/1986 | European Pat. Off. ............ 411/469 |
| 3011158 | 10/1981 | Fed. Rep. of Germany . | |
| 1477660 | 3/1967 | France ...................... 248/475.1 |
| 365829 | 1/1932 | United Kingdom ............ 248/216.1 |
| 475136 | 5/1937 | United Kingdom . | |
| 719797 | 12/1954 | United Kingdom . | |
| 971370 | 9/1964 | United Kingdom ................ 411/41 |
| 1273660 | 5/1972 | United Kingdom . | |
| 1327202 | 8/1973 | United Kingdom . | |
| 1546330 | 5/1979 | United Kingdom . | |
| 2028630 | 3/1980 | United Kingdom . | |
| 0068269 | 1/1983 | United Kingdom . | |

*Primary Examiner*—Rodney M. Lindsey
*Attorney, Agent, or Firm*—Toren, McGeady & Associates

[57] ABSTRACT

Considerable difficulties are encountered in fixing holding devices for objects to or into motor vehicle interior parts made from foamed material, such as e.g. mirrors to sun visors. It is therefore proposed to provide on the holding devices, sinking pins with passage openings and cross-pins, which are driven through the passage openings into the foamed material.

15 Claims, 3 Drawing Sheets

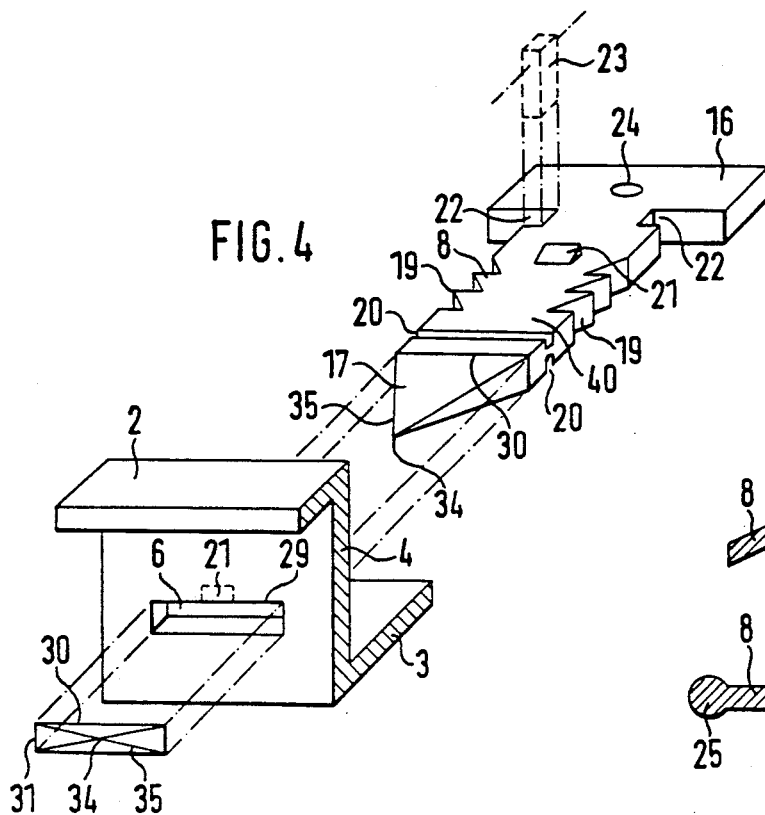
FIG. 4
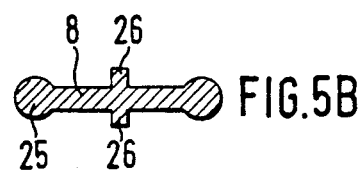
FIG. 5A
FIG. 5B
FIG. 5C
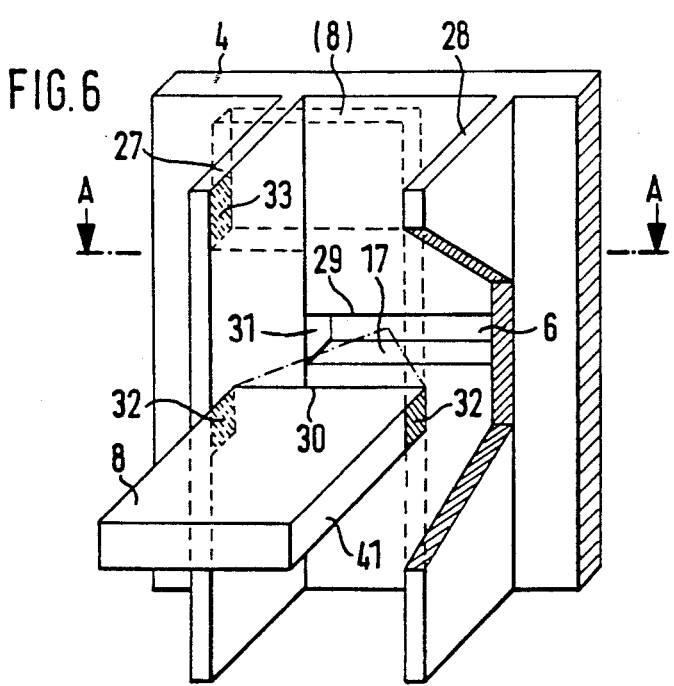
FIG. 6
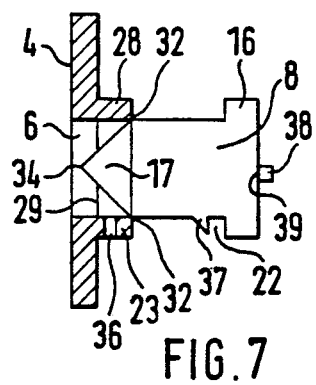
FIG. 7

HOLDING DEVICE FOR FIXING OBJECTS TO MOTOR VEHICLES INTERIOR PARTS

This is a continuation application of Ser. No. 07/325,364, filed Mar. 17, 1989, now abandoned.

BACKGROUND OF THE INVENTION

The invention relates to a holding device for fixing objects to or into foamed material vehicle interior parts, particularly mirrors to sun visors, the holding device having anchoring elements, which engage in the foamed or expanded material in such a way as to fix the holding device.

Vehicle interior parts, such as dashboards, door panels, or sun visors are preferably made from foamed material, because in the case of an accident these materials damp or absorb the impact of a person. Generally the foamed material is covered with a foil or film, or is shaped in such a way that the internal cell structure is not visible to the outside. As a function of the intended use, the foamed material can have varying hardness levels.

Admittedly the closed surface of the foamed material permits the fixing of objects and holding devices by means of an adhesive-bonded joint, but over a long period such a joint is often not sufficiently stable and durable, which can e.g. be attributed to heat and light actions, or to vibratory movements. These fixing problems more particularly occur if the foamed interior part is constructed in a very flat manner without a supporting substrate or base, such as in the case of a sun visor.

Thus, in the case of flat interior parts, which also have to be moved manually, torsional problems occur, which in the long run weaken the adhesive-bonded joint. The fitting of additional objects, which mostly takes place by means of a holding device, is consequently made very difficult. In addition, an adhesive-bonded joint requires a large amount of positioning work, which prevents rapid working. Articles to be fitted can be mirrors, ball pen mounting supports, cigarette cases, etc.

The holding device can itself form part of the article to be fixed.

DESCRIPTION OF THE PRIOR ART

In order to solve these fixing and fastening problems, apart from an adhesive fixing means, DE-OS 30 11 158 refers to an anchoring element in the form of a pin or dowel. Thus, a casing or housing for a mirror is to be fixed in a foamed sun visor body by means of dowels as anchoring elements formed on the said housing. The housing consequently serves as a holding device for the mirror and is in turn to be durably fixed by means of the dowels in the sun visor body. DE-OS 30 11 158 does not state how the dowels are to be designed and also the dowel principle is based on an expanding or spreading action thereof, which would increase the frictional engagement of the dowel in the foamed material. However, the expanding action of the dowel leads to the risk of the flat sun visor tearing at a particular point as a result of excessive expanding forces. Thus, although fastening is improved by dowel anchoring as opposed to bonding, there is a continual risk of the foamed body being damaged from the inside. In addition, in the case of elastic foamed articles, dowel fixing causes considerable problems, because the material yields to the expanding forces. Therefore with the tearing risk, dowel fixing can only be used with rigid foamed articles. If, in addition to the expanding forces, other forces occur, e.g. due to vibrations or manipulations, the risk of tearing is further increased. Thus, a durable fixing of the holding device to or into vehicle interior parts is not ensured.

OBJECT OF THE INVENTION

The object of the invention is therefore to provide a holding device of the aforementioned type with anchoring elements, which permit rapid working and ensure durable fixing, substantially independently of the hardness or rigidity of the foamed material.

SUMMARY OF THE INVENTION

According to the present invention, there is provided a holding device for fixing objects to or into motor vehicle interior parts made from foamed material the holding device having anchoring elements, for engagement in the foamed material so as to fix the main body of the holding device in position, the anchoring elements comprising sinking pins with passage openings formed therein for positioning in the direction of a material accumulation of the foamed material, and cross-pins, which can be fixed by one end in the passage opening and can be driven with their free ends through the latter in undercutting manner into the foamed material with respect to the removal direction of the holding device.

The sinking pins with the passage openings formed therein have the function of ensuring the introduction of the cross-pins in the direction of an accumulation of the foamed material. For example, in the case of a sun visor, the total length of the foamed article constitutes a much greater material accumulation than the thickness of the foamed article. Thus, this applies to foamed linings or panels and the like, in which the greatest material accumulation is in the direction of the major plane thereof. In addition, the sinking pins ensure that the cross-pins are not only positioned with respect to the plane as the largest material accumulation, but also that the insertion point is arranged in an optimum manner regarding the depth or thickness of the foamed material. For example the optimum insertion point for a sun visor foamed article is half-way through the thickness of the sun visor.

The cross-pins also have a nail function. However, an important difference compared with the nail principle is that the fixing forces of the cross-pins are mainly not applied through the foamed material. Thus, once again the cross-pins are fixed by the sinking pins in the passage openings. Therefore much smaller expanding forces occur in the foamed material than in the case of the dowel principle. Therefore the main function of the cross-pins, following the application of the holding device, is to form undercuts in the foamed material counter to the separating or removal direction of the holding device.

Therefore, with respect to the cross-section, it is not a question of driving very thick cross-pins into the foamed material. In fact the cross-pins should be as thin as possible, but have a large surface area. Preferably the largest surface of the cross-pins is at right angles to the removal direction of the holding device. The large-area cross-pins consequently offer the advantage that the forces emanating from them can be distributed in large-area manner on the surrounding cells of the foamed material. Therefore there is a reduction in the punctiform force concentrations leading to the tearing of the foamed material. The external forces acting on the holding device are distributed over the individual sinking pins or cross-pins and are absorbed in damping manner by the foamed material, which surrounds the cross-pins, as a result of its inherent elasticity and transferred to more remote material in large-area manner.

Thus, the sinking pins, which also have the aforementioned positioning function for the cross-pins, co-operate with the latter in such a way that the sinking pins ensure the position of the holding device along the surface or plane of the interior foamed material part and the cross-pins prevent a removal or extraction of the holding device from the foamed material. As a result of the previously described advantageous force distribution, whereby it is not a question of expanding forces in the case of the cross-pins, a durable fixing or anchoring of the holding device in the foamed material is ensured substantially independently of the material hardness.

Due to the fact that the sinking pins are constructed on the holding device, for the final fixing it is merely necessary to insert the required number of cross-pins. Therefore the holding device can be advantageously very rapidly fixed, the sinking pins engaging in prepared depressions with a working space in the foamed material for the cross-pins.

According to a further development, the time required for fixing is additionally shortened in that the cross-pins are injection moulded from plastics material together with the sinking pins and the cross-pins, by means of a separating or tearing surface, can be directly jointly injection moulded on the holding device or sinking pins. Thus, with the sinking pins the cross-pins form a functional unit permitting a rapid and reliable anchoring of the holding device. According to another further development the cross-pins are in the insertion direction directly injection moulded onto the associated passage opening.

The invention also extends to a part made from foamed material for a vehicle interior, said part incorporating a holding device according to the invention.

BRIEF DESCRIPTION OF THE DRAWINGS

For a better understanding of the invention, and to show how the same may be carried into effect, reference will now be made, by way of example, to the accompanying drawings, in which:

FIG. 4 is a perspective view of an embodiment of a cross-pin in the insertion position on a passage opening formed in a sinking pin, FIGS. 5 A, B, C show various shapes the cross-pins can take, the cross-pins having surface-enlarging elements, FIG. 6 is a perspective view of a cross-pin and sinking pin, which are interconnected by means of separating or tearing surfaces, and FIG. 7 is a section taken along line A—A in FIG. 6.

DETAILED DESCRIPTION OF THE PREFERRED EMBODIMENTS

Figure 1:
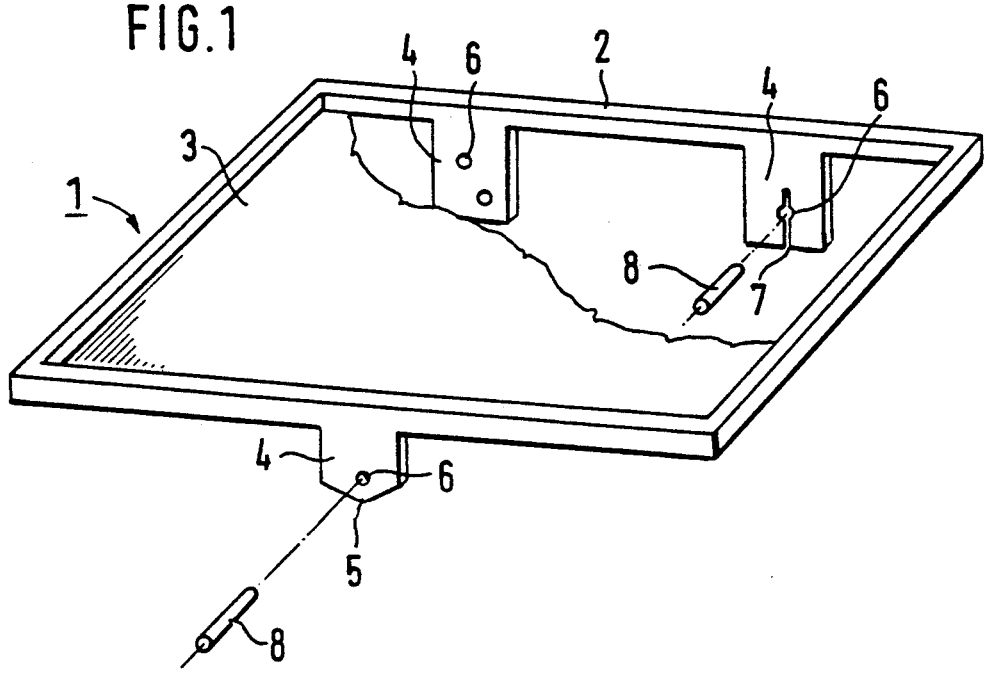
FIG. 1 is a perspective view of a holding device for fixing objects to or into motor vehicle interior parts made from foamed material and in particular mirrors on sun visors.

FIG. 1 is a perspective view of a holding device 1 with a rim 2, which surrounds a base 3. The holding device 1 has for example a rectangular basic shape. On the base 3 can be constructed for example holding elements for ball pens, notepads, lipsticks, etc., which are not shown in FIG. 1 for clarity. The holding device 1 also has sinking or countersinking pins 4 which, as described hereinafter, engage in the foamed material 10 (cf. FIG. 2) of a motor vehicle interior part. The latter can be a dashboard, door panel, sun visor, etc.

Figure 1A:
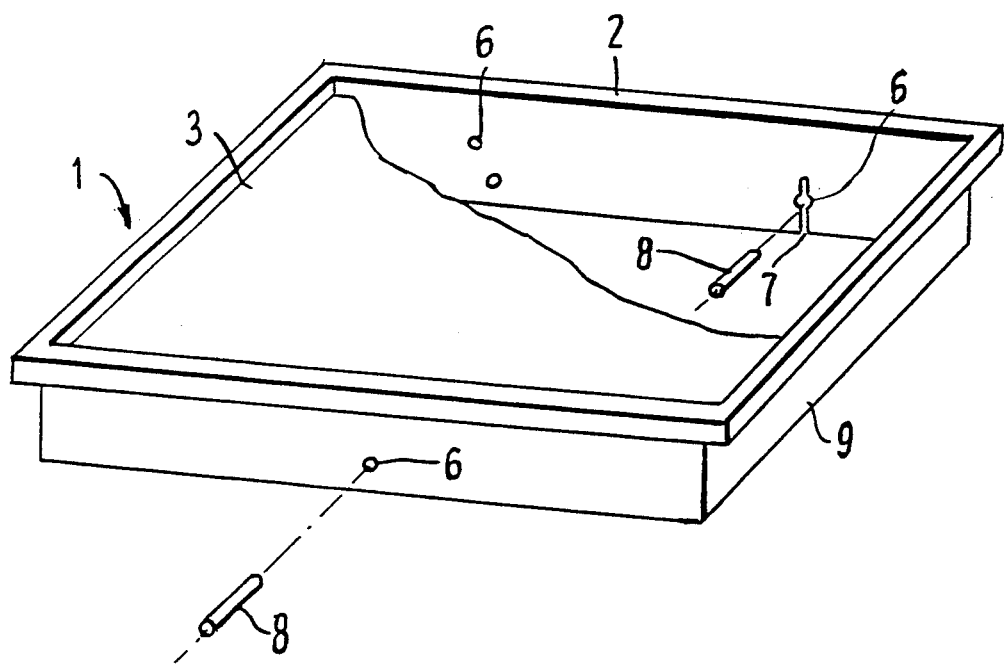
FIG. 1A is a view similar to FIG. 1, of an alternative embodiment.

Each sinking pin 4 has one or more passage openings 6 for cross-pins 8. The number of sinking pins 4 and cross-pins 8 is a function of the shape of the holding device 1, the load to be applied and the characteristics of the foamed material. The sinking pins 4 hold the cross-pins 8 after pressing into the associated passage opening 6. Therefore, preferably the cross-sections of the passage openings 6 are adapted to the cross-sections of the cross-pins 8 and form a force fit. For obtaining the force fit, a sinking pin 4 can have a longitudinal slit 7 in the vicinity of the passage openings 6. As shown on the front sinking pin 4, the sinking pins 4 can be provided at the free end with a point or tip 5, in order to facilitate the pressing or sinking of the pin 4 into the foamed material. As shown in FIG. 1A, the sinking pins 4 can also be constructed as a wall portion or a completely surrounding wall 9. The direction in which the cross-pins 8 are to be introduced into the sinking pins 4 and which recesses are to be provided in the holding device and the foamed material will be described hereinafter with reference to FIGS. 2 and 3.

Figure 2:
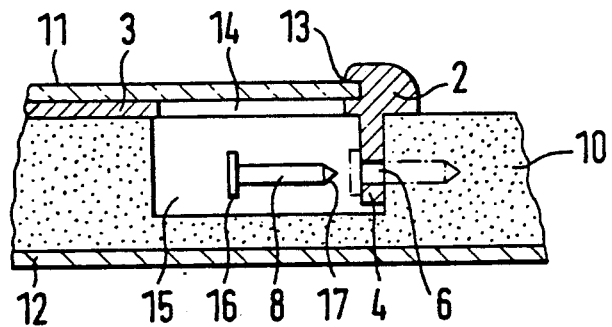
FIG. 2 is a section through an edge region of the holding device shown in FIG. 1, which is inserted in a vehicle interior part made from foamed material.

FIG. 2 shows a section through a marginal area of the holding device 1, which is inserted in the foamed material 10 of a vehicle interior part. Material 10 rests for example on a substrate or base 12, e.g. a sheet metal part. It is also possible to omit the substrate 12, such as for example the case with a sun visor, which is made from a flat foamed article, whose surface is accessible on both sides. The base 3 of the holding device 1 which, for example in the vicinity of the surface of the foamed material 10, carries a mirror 11, which is provided on the sinking pin 4 with a perforation 14. Below the latter is formed a working space 15 in the foamed material 10. The working space 15 is necessary so that, following the insertion of the holding device 1, the cross-pin 8 can be inserted in the passage opening 6.

Following the insertion of the cross-pin 8, the mirror 11 is fitted and for example locked in undercut marginal fastenings. Therefor the mirror 11 conceals the working space 15 in the foamed material 10 and it is no longer possible to see from the outside how the holding device 1 is fixed in the foamed material interior part.

It is advantageous in this construction of holding device 1 if the cross-pins 8 extend from the inside to the outside and the perforations 14 and working spaces 15 are covered. However, in other cases, the cross-pins 8 can be inserted from the outside to the inside. In addition, the working spaces 15 can be formed by cuts in the foamed material 10, into which are pressed down the sinking pins 4 and cross-pins 8.

A pointed tip 17 is provided on the front free end of the cross-pin 8 in FIG. 2, whilst a head 16 is provided at the rear end. Thus, the cross-pin 8 is in the form of a nail, but the longitudinal portion of the cross-pin 8 is kept in position by the sinking pins 4 and not by the foamed material 10. As shown in FIG. 2, the sinking pin 4 has the function of providing the passage opening 6 in an appropriate depth of the foamed material 10. Every effort should be made to locate the passage opening 6 as low as possible in the foamed material 10, so that a maximum amount of said material is located over the inserted cross-pins 8, because the anchoring of holding device 1 increases with the amount of material 10 located over the cross-pins 8.

The second function of the sinking pin 4 is to orientate the insertion direction and end position of the cross-pins 8 to a large accumulation of material 10. The foamed material 10 generally comprises a layer of a certain thickness and the greatest material accumulation is in the plane of the layer. It is therefore possible to insert cross-pins 8 having a length which is greater than the thickness of the foamed material layer. The actual fixing or anchoring of the holding device 1 is then obtained through the longitudinal portions of the cross-pins 8, which engage in fixing and undercutting manner in material 10, i.e. the holding forces are absorbed in a damping manner by the accumulations which have collected over the longitudinal portions of cross-pins 8 counter to the removal direction of the holding device 1 from the surface of the foamed material 10. Therefore, the necessary holding force quantity is determined by the length, as well as the number of cross-pins 8. Due to the orientation of the cross-pins 8 along the plane of the layer of material 10, this leads to a maximum constructional dimensioning tolerance.

Due to the fixing of the cross-pins 8 in the sinking pins 4, the undercutting orientation of the cross-pins 8 is also maintained in the case of soft foamed materials. In addition, the large surface distribution of the holding or anchoring forces through the cross-pins 8 contributes to reducing the tearing tendency of the foamed material 10. Due to the fixing in the sinking pins 4, the cross-pins 8 cannot fall out, which leads to a durable anchoring. Whilst the cross-pins 8 transfer the removal or compressive forces to the foamed material 10, the sinking pins 4 prevent a displacement of the holding device 1 along the plane of the layer of the foamed material 10. In FIG. 2 the cross-pin 8 has a pointed tip 17, so as to facilitate the driving into the material 10, particularly in the case of harder material and to prevent a material compression during driving in at the front free end of the cross-pin 8, which would bring about a material surface curvature. The head 16 limits the pressing in length of the cross-pins 8. The longitudinal portions of the cross-pins 8 can also be adapted to the curvature of the foamed body, if the latter or substrate 12 is not flat.

Figure 3:
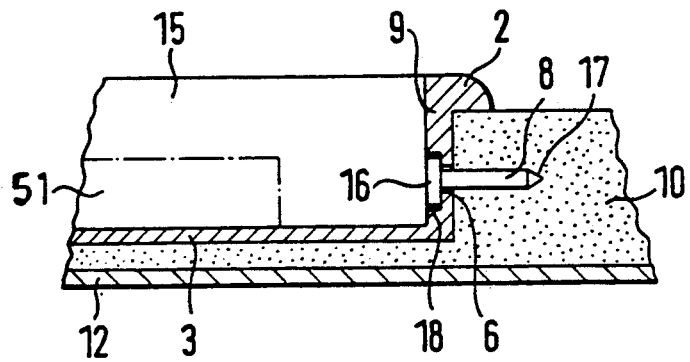
FIG. 3 is a section through an edge region of a trough-shaped holding device, which is inserted in a vehicle interior part made from foamed material.

FIG. 3, like FIG. 2 shows a section through an edge region of a holding device 1, which, together with the lower-lying base 3 and wall 9 forms a trough-shaped insert. In the interior of the insert, which here also forms the working space 15 for the insertion of cross-pins 8, it is once again possible to house objects 51 (indicated by dot-dash lines). Unlike in FIG. 2, in which the end position of a cross-pin 8 is also indicated in dot-dash line manner, FIG. 3 shows a cross-pin 8 in the completely pressed-in state. In order that the use of the interior of the trough-shaped insert at walls 9 is not impeded by the projecting heads 16 of the cross-pins, depressions 18 adapted to the size and shape of the heads 16 are provided. Thus, the heads 16 are countersunk to terminate flush with the inside of the wall 9.

FIG. 4 shows another embodiment of a cross-pin 8. Diverging from the embodiments shown in FIGS. 1 to 3, which are directed at cross-pins 8 with a circular cross-section, the cross-pin of FIG. 4 has a rectangular cross-section. For ease of representation reasons, the cross-pin 8 is shown with a relatively thick cross-section. However, the cross-pin 8 can also be made very flat, which is a function of the foamed body material and the thickness of said foamed material 10. Thus, as stated hereinbefore, it is not so much a question of the cross-pin 8 exerting expanding forces on the foamed material 10. In fact, the cross-pin 8 must be embedded in undercutting manner in the material 10. A cross-pin 8 with a flat cross-section meets the requirement for low expanding forces, the flat side 40 of the cross-pin 8 being preferably orientated in such a way that it is parallel to the surface of the foamed material 10. As compared with a thin, nail-like cross-pin 8 with the described advantage of substantially unimpeded length extension, in the case of the flat cross-pin 8 there is the additional advantage of a width expansion. The force transfer to the foamed material is consequently further improved and a force transfer surface is obtained, which is determined by the length and width of the cross-pin 8.

The cross-pin 8 of FIG. 4 has a tip 17, which, going from the transition edge 30, passes from the longitudinal portion into a pyramid. On considering the tip 17 through the passage opening 6 in the sinking pin 4 with the rim 2 and base 3, edges 30, 31, 34 and 35 of the pyramidal tip 17, as shown in FIG. 4, form a rectangle with two crossed diagonals. This manner of consideration is of significance for the fixing of the cross-pin 8 in the insertion position described hereinafter relative to FIG. 6.

In the vicinity of the transition edge 30, the cross-pin 8 has desired or predetermined breaking points 20 for the tip 17. The predetermined breaking points 20 are more particularly necessary if relatively long cross-pins 8 are provided so that in the case of an unfavourable impact of a person, the tips 17, e.g. do not fall out of a sun visor and injure the person. It is also possible to provide predetermined breaking points 20 within the longitudinal portion of cross-pin 8. The predetermined breaking points 20 are also significant if the rim 2 must be kept narrow and do not cover the tips 17.

For a further improved anchoring of the longitudinal portion of the cross-pin 8, it can be advantageous to provide undercuts 19 or other surface-enlarging elements 25, 26 (cf. FIG. 5A-5C). In particular the undercuts 19, which can be inserted in the foamed material help to ensure that the cross-pin 8 cannot perform small rubbing or wearing movements in the material 10, but as a result of the anchoring instead co-vibrates with the surrounding material 10. By means of increased frictional engagement as a result of the enlarged surface, a co-vibration can be ensured and rubbing and squeaking prevented. Whereas in FIG. 4 for this purpose saw-tooth-like undercuts 19 are formed on the sides of the cross-pin 8, which act in undercutting manner counter to the withdrawal direction of the cross-pin 8, the cross-sections of cross-pins 8 according to FIGS. 5B and 5C have circular marginal webs 25 or web 26, which increase the surface area. According to FIG. 5A a surface enlargement is obtained by a cross-sectionally curved cross-pin 8. The number, shape and position of the surface-enlarging elements are a function of the fact that it is not possible to exceed certain expanding forces due to the material displacement in the foamed material 10.

Obviously the undercuts 19 can also be formed on the flat side 40 and can e.g. comprise studs and the like. As a function of the intended use, the undercuts 19 and surface-enlarging elements can be combined.

It is also possible to provide on the cross-pins 8 expanding members 21 and locking grooves 22, which serve to fix the cross-pin 8 in the sinking pin 4. For example, following the complete insertion of the cross-pin 8, the expanding member 21 jumps up on the upper edge 29 of the passage opening 6 and prevents retraction. Spring elements 23 engaging in the locking grooves 22 act in the same way and according to FIG. 4 are constructed in a hidden manner on the back of the sinking pin 4 and are consequently only shown in broken line form.

In the head 16 is provided a transverse hole 24, which facilitates the insertion and removal of the cross-pin 8. As can also be seen in FIG. 4, the passage opening 6 in the sinking pin 4 forms a sliding guide, which maintains the position of the inserted cross-pin 8. Thus, the cross-pin 8 cannot perform pivoting movements in the passage opening 6. Although the longitudinal section of the cross-pin 8 preferably extends at a right angle to the sinking pin 4, pin 8 can, as a function of the particular case, also be at another angle of inclination to the sinking pin 4. The sinking pins 4 can also be under an inclination angle of the holding device 1.

FIG. 6 is a perspective view of the fixing of a cross-pin 8 prior to its introduction into the passage opening 6. As described hereinbefore, the cross-pin 8 together with a sinking pin 4 forms a unit. The unitary function exists independently of the consideration as to whether the cross-pin 8 has already been inserted in the passage opening 6, because the individual parts are matched to one another. In order that the cross-pin 8 can be rapidly inserted, the invention also proposes the simultaneous injection moulding of the holding device 1 or sinking pin 4 and cross-pin 8, the latter being jointly injection moulded by means of a separating or tearing surface 32, 33, 39.

As shown in FIG. 7 (a section along line A—A in FIG. 6), the separating or tearing surface 39 can be provided between the head 16 and a holding web 38, which is connected to the base 3 (not shown). Diverging from this, in FIG. 6 there are two spacing webs 27, 28, which are constructed on the sinking pin 4 with the spacing of the width of the cross-pin 8. Thus, it is possible to injection mould jointly the cross-pin 8 orientated parallel to the sinking pin 4 by means of the separating surfaces 33. The cross-pin 8 can also be injection moulded orientated like a spacing web. In all cases the cross-pin 8 can easily be broken off and driven into the passage opening 6.

Driving in can take place particularly rapidly if the cross-pin 8 is jointly injection moulded with the tip 17 directed at the passage opening 6. For ease of viewing purposes, the tip 17 is shown in dot-dash line manner in FIG. 6. For the same reason the spacing web 28 is shown with a break. The parallel spacing webs 27, 28 are on either side of the lateral edges 31 of the passage opening 6 or the lateral faces 41 of the cross-pin 8. The cross-section of the cross-pin 8 corresponds to the surface of the passage opening and the cross-pin 8 is set back by the width of the spacing pins 27, 28 on the imaginary, extended line of the insertion direction. As the transition edge 30 of the cross-pin 8 is positioned by a small amount in the direction of the passage opening 6, then at the transition points from cross-pin 8 to spacing webs 27, 28 separating or tearing surfaces 32 are formed on either side, if cross-pin 8 is simultaneously injection moulded in one operation. As a function of whether the cross-pin 8 is injection moulded closer or further from the passage opening 6, the separating or tearing surface 32 is made larger or smaller.

If the cross-pin 8 is jointly injection moulded without the tip 17, the two spacing webs 27, 28 form guide elements following the breaking off of the cross-pin. However, a jointly injection moulded tip 17 facilitates the insertion of the cross-pin 8 into the passage opening 6. This is particularly the case if the tip 17 has a pyramidal configuration and, as shown in FIG. 7, the furthest forward point 34 of the tip 17 is located in the passage opening 6.

The pyramidal tip 17 also ensures that the pyramidal faces, due to the injection moulding process, are not in contact with the insides of the passage opening 6 and do not form further separating or tearing surfaces. Thus, the tip is completely free within the passage opening 6 and following the breaking off of the cross-pin 8 at the separating faces 32, the tip 17 forms a guidance element, which facilitates the insertion of the cross-pin 8 into the passage opening 6, besides the spacing webs. However, it is also possible to injection mould the cross-pin 8 so close to the passage opening 6, that the transition edge 30 coincides with the upper edge 29 of passage opening 6. In this case the cross-pin 8 would engage on the pin 4 via all four transition edges 30, 31. Thus, the spacing webs 27, 28 have the function of constructing the transition edges 30, 31 remote from the pin 4 with only two separating or tearing surfaces, which facilitates breaking off.

However, it is also possible to produce the cross-pins 8 in a separate operation and to provide two guide grooves on the spacing webs 27, 28 and which extend to the passage opening 6. The cross-pins 8 inserted in the guide grooves can be jointly supplied to the final fixing process, without the tips 17 projecting in an impeding manner out of the sinking pins 4. By providing a slit 36 (FIG. 7), the spacing webs 27, 28 can also be formed into the spring elements 23 described when referring to FIG. 4 and which for example engage by means of a detent 37 into the locking grooves 22.

What is claimed is:

1. A holding device for fixing an object to or into a motor vehicle interior part made from foamed material, the holding device having a main body, and anchoring elements for engagement in the foamed material so as to fix the main body of the holding device in position, the anchoring elements comprising sinking pins with transverse passage openings formed therein, said sinking pins being insertable into the foamed material part, and cross-pins each having one end which can be fixed in the passage opening and a free end which can be driven laterally to the sinking pins and through the passage opening into the foamed material in an undercutting manner with respect to a removal direction of the holding device so that anchoring is effected solely by said cross-pins.

2. A holding device according to claim 1, wherein the cross-pins are jointly injection moulded by means of separating or tearing surfaces on the main body of the holding device or on the sinking pin, which are made from plastics material.

3. A holding device according to claim 2, wherein, in an insertion position facing the passage openings, the cross-pins are injection moulded on the sinking pins.

4. A holding device according to claim 2, wherein, in the vicinity of transition edges between the main body of the holding device and the cross-pins, the separating or tearing surfaces are formed on the cross-pins.

5. A holding device according to claim 2, wherein the separating or tearing surfaces are constructed on spacing webs which are located in spaced manner one on either side of each cross-pin.

6. A holding device according to claim 1, wherein the cross-section of the cross-pins corresponds to the cross-section of the passage openings, the cross-sections being rectangular.

7. A holding device according to claim 6, wherein there is a force fit between the cross-pins and their passage openings.

8. A holding device according to claim 6, wherein for fixing in the passage openings, the cross-pins have at least one of expanding members and/or locking grooves and there being spring elements on the sinking pins engaging in the locking grooves when provided.

9. A holding device according to claim 6, wherein for anchoring in the foamed material, the cross-pins have undercuts and/or surface-enlarging elements.

10. A holding device according to claim 1, wherein each cross-pin has at least one of a pointed tip and a flattened head.

11. A holding device according to claim 10, wherein, when the head is provided, a transverse hole is formed in the head.

12. A holding device according to claim 1, wherein the cross-pins have a predetermined breaking region, to sever them in the event of unintentional impact.

13. A holding device according to claim 10, wherein the tip of each cross-pin has a pyramidal shape construction.

14. A holding device according to claim 1, wherein the sinking pins form the wall of a trough-shaped holding device, which can be inserted in a recess of the foamed material.

15. A holding device according to claim 2 wherein the separating or tearing surfaces are constructed on spacing webs which are located in spaced manner one on either side of each cross-pin and, for fixing in the passage openings, the cross-pins have locking grooves and there being spring elements on the sinking pins engaging in the locking grooves, said spring elements being formed on said spacing webs as slitted portions.

* * * * *

UNITED STATES PATENT AND TRADEMARK OFFICE
CERTIFICATE OF CORRECTION

PATENT NO. : 5,090,858

DATED : 25 February 1992

INVENTOR(S) : Jean-Christophe Canadas

It is certified that error appears in the above-identified patent and that said Letters Patent is hereby corrected as shown below:

On Title page, item

(73) Assignee : Rockwell-Cim Societe Anonyme, Rupt-sur-moselle  FRANCE

Signed and Sealed this

Thirteenth Day of July, 1993

Attest:

MICHAEL K. KIRK

*Attesting Officer*      Acting Commissioner of Patents and Trademarks